(12) United States Patent
Neumeier (10) Patent No.: US 6,974,287 B2
(45) Date of Patent: Dec. 13, 2005

(54) TOOL CLAMPING DEVICE

(75) Inventor: Manfred Neumeier, Esslingen (DE)

(73) Assignee: ESA Eppinger GmbH, Denkendorf (DE)

( * ) Notice: Subject to any disclaimer, the term of this patent is extended or adjusted under 35 U.S.C. 154(b) by 174 days.

(21) Appl. No.: 10/427,063

(22) Filed: Apr. 30, 2003

(65) Prior Publication Data

US 2004/0009047 A1  Jan. 15, 2004

(30) Foreign Application Priority Data

May 2, 2002  (DE) ............................ 102 19 599

(51) Int. Cl.[7] .................... B23C 5/26; B23B 27/00
(52) U.S. Cl. ............ 409/232; 409/234; 408/239 R; 408/239 A; 279/8; 279/141; 279/137; 82/160; 82/158
(58) Field of Search ................ 409/213–234; 279/8, 141, 137, 42, 43.5; 408/238–239 A; 82/158–161

(56) References Cited

U.S. PATENT DOCUMENTS

| | | | | |
|---|---|---|---|---|
| 4,535,658 A | * | 8/1985 | Molinari | 81/177.85 |
| 5,026,224 A | * | 6/1991 | Andersson et al. | 409/234 |
| 5,234,296 A | * | 8/1993 | Presby et al. | 409/234 |
| 5,567,093 A | * | 10/1996 | Richmond | 409/234 |
| 5,620,188 A | * | 4/1997 | McCurry et al. | 279/48 |
| 6,569,022 B2 | * | 5/2003 | Johnson et al. | 408/238 |
| 2004/0060180 A1 | * | 4/2004 | Nelson | 33/18.1 |

FOREIGN PATENT DOCUMENTS

| | | |
|---|---|---|
| DE | 885 644 | 6/1953 |
| DE | DT 2113137 | 10/1971 |
| DE | 90 03 730.8 U1 | 8/1990 |
| DE | 34 43 636 C 2 | 1/1996 |
| DE | 19735420 C2 * | 2/1999 |
| DE | 199 58 461 C 1 | 3/2001 |
| EP | 0 048 578 A2 | 1/1981 |
| EP | 0 416 601 B1 | 9/1990 |

OTHER PUBLICATIONS

European Search Report dated Sep. 09, 2003.

* cited by examiner

*Primary Examiner*—Erica E Cadugan
(74) *Attorney, Agent, or Firm*—Emch, Schaffer, Schaub & Porcello Co., L.P.A.

(57) ABSTRACT

A tool clamping device for a tool having a shaft which is accurate to size and which can be inserted into the receiving bore of a tool support, is provided with a clamping device which can be screwed on a screw thread of the tool support while the tool has a ring, which is arranged radially protruding in a clamping area. The ring extends in the circumferential direction and, with the shaft of the tool inserted into the receiving bore, the clamping device is axially supported against the ring (FIG. 2).

17 Claims, 6 Drawing Sheets

TOOL CLAMPING DEVICE

TECHNICAL FIELD

The invention relates to a tool clamping device, having tool support means containing a tool receiver with a receiving bore, and having tool means with an accurate to size shaft, which can be inserted into the receiving bore, as well as a clamping device.

BACKGROUND OF THE INVENTION

Citing a few examples, tool support means are here understood to be a spindle, a chuck, a drilling tool, or the like, in particular a tool holder in accordance with DIN 69 880, July 1990, such as is known in actual use in a multitude of embodiments for fixed and rotating tools. Tool holders with collet chuck receivers are also a part of this, wherein the tapering bore of the collet chuck receiver is used as the receiving bore within the meaning of the present invention. Examples of tool supports with collet chucks are described, for example, in German Utility Model 90 03730, in EP 0 416601 B1 and in DE 199 58 461 C1.

In actual use, automatic tool changing systems are employed, particularly for tool changes in CNC processing centers, automatic lathes and milling machines, and the like, which perform a quick tool change and thereby reduce idle times to a minimum. Such tool changing systems often operate with so-called quick-action change inserts, in which the respective tool is received accurate to size and which are inserted in the course of a tool change into a tool receiver, for example a work spindle, in which they are clamped with close tolerances, so that a high degree of work accuracy results when the tool is employed. Quick-acting change inserts for screw taps are described, for example, in DIN 6393, February 1993. In many cases the clamping of the quick-action change insert in the associated receiver of the work spindle is performed centrally from the side opposite the tool by means of a threaded spindle, which is arranged in a appropriate bore of the work spindle. Such central tool clamping by means of a threaded spindle is also widely used in cases in which a tool is directly inserted with its clamping shaft into a corresponding receiver of a work spindle or the like.

But central clamping from behind is not possible, for example in connection with tool holders which are arranged, placed closely next to each other, on the turret disk of a tool turret. Occasionally there are also cases of application in which the use of a quick-action change insert would be desirable per se, but where an automatic tool change is not possible for reasons of system technology.

SUMMARY OF THE INVENTION

The apparatus of the invention provides a tool clamping device which can be operated from the tool side. It is distinguished by only a little structural outlay, which permits, if required, to clamp quick-action change inserts manually in tool support means, without being necessary to make large changes in the quick-action change inserts.

For attaining this, the tool clamping device in accordance with the invention has the following characteristics.

The clamping device has a ring, which is arranged on the tool means, radially projects in a clamping area, and extends entirely or partially in the circumferential direction on the circumference. With a shaft of a tool means inserted into the receiving bore, clamping means are axially supported against this ring and clamp the tool means against the tool support means. In one embodiment, the clamping means have a tensioning screw which is screwed on a screw thread of the tool support means. The tensioning screw can here be maintained, secured against loss, on the tool means. It is particularly practical if the ring is a split ring which has been inserted into at least one groove provided on the circumference of the clamping area of the tool means. In the case where the tool means contain a quick-action change insert, the groove can be a clamping groove for a tool clamping device of a tool quick-action change system. In this way an opportunity is provided, by means of which it is possible to clamp the quick-action change insert in a tool receiver with the aid of the clamping means by the simple insertion of a split ring into the clamping groove of the quick-action change insert, without it being necessary to perform any modifications at all on the quick-action change insert itself. By means of this, the employment possibilities for quick-action change inserts can be extended, by means of which it is also possible in certain cases of use to obtain considerable cost savings. The tensioning screw is advantageously designed as a cap nut, which can be screwed on an external screw thread of the tool support means. However, designs are basically also conceivable in which the tool support means have an internal screw thread which extends coaxially in relation to the receiving bore and in which the tensioning screw is embodied as a threaded ring with an external screw thread. In these cases the outer diameter of the ring arranged on the tool means is less than the inner diameter of the internal screw thread on the tool support means. With another embodiment, the clamping means have clamping elements which act axially on the ring of the tool means, are axially movable in a limited way, and are seated so they can be clamped in the axial direction on the ring of the tool means. However, in principle many embodiments of clamping means are conceivable, which can be used according to their intended purpose. It is essential that they can be operated from the direction of the tool side.

Further developments of the novel tool clamping device are the subject of the following description.

Exemplary embodiments of the subject of the invention are represented in the drawings.

BRIEF DESCRIPTION OF THE DRAWINGS

DETAILED DESCRIPTION OF THE INVENTION

Figure 1:
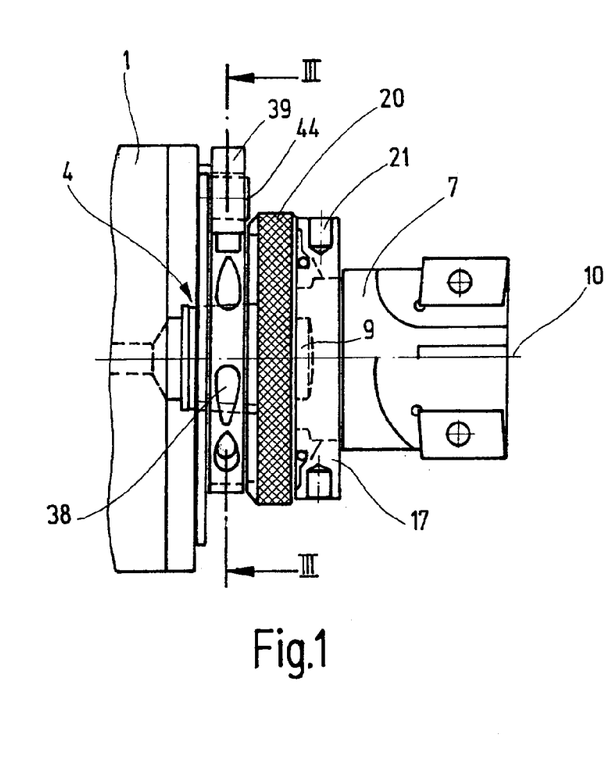
FIG. 1 represents a tool holder with a tool clamping device in accordance with the invention in a lateral view in section.
Figure 2:
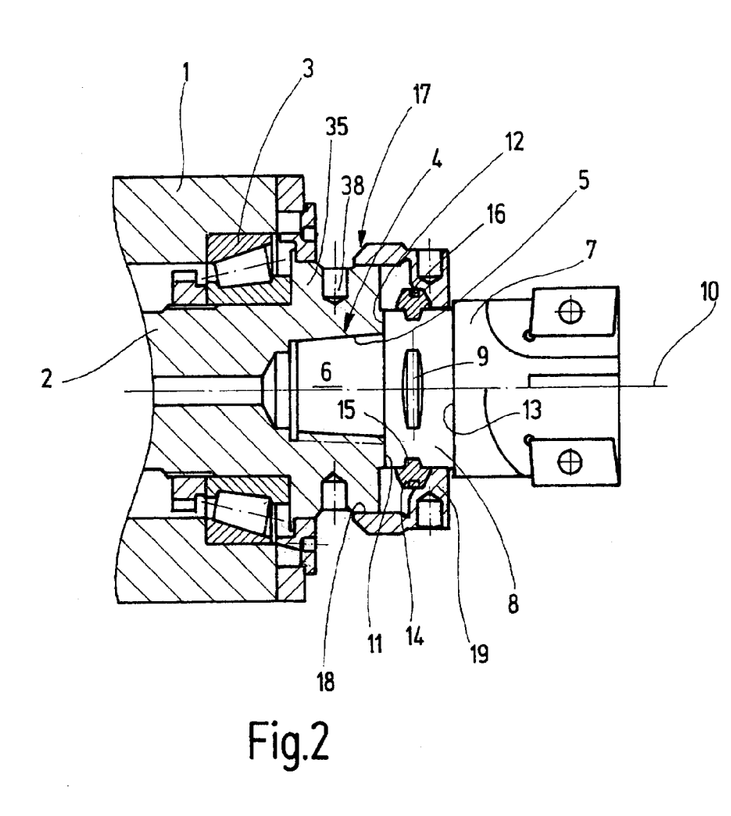
FIG. 2 shows the tool holder in accordance with FIG. 1 in axial section in a lateral view.
Figure 3:
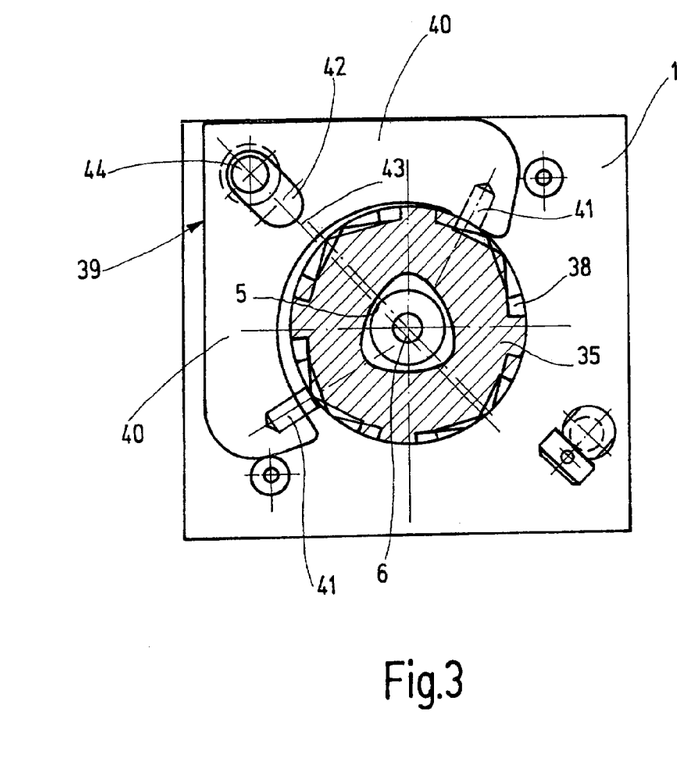
FIG. 3 shows the tool holder in accordance with FIG. 1, cut along the line III—III in FIG. 1, in a lateral view.

FIGS. 1 to 3 show a tool holder for a rotating tool, wherein only the parts adjoining the tool side are represented. The tool holder has a substantially parallelepipedal housing 1, in which a spindle 2, which constitutes a tool support means, is rotatably seated on rolling bearings 3. Regarding the structural details, known per se, of such tool holders, reference is made to DIN 69880, and DE 197 35 420 C2, as well as DE 199 58 461 C1, of Applicant.

The spindle 2 is embodied with a tool receiver 4, which has a tapered receiving bore for accepting the shaft 6 of a milling tool 7, which is designed correspondingly tapered. As can be seen in FIG. 3, the receiving bore 5 and the shaft 6 of the milling tool 7 inserted in it are designed to be polygonal in cross section. A cylindrical section 8, which is coaxial with the shaft 6, of the tool body of the milling tool 7 adjoins the shaft 6 in the axial direction. Four clamping grooves 9 in the shape of grooves with level bottoms are arranged in the cylindrical section 8 on locations which are placed in pairs opposite each other and extend at right angles in respect to the shaft center axis 10 in the circumferential direction of the cylindrical section.

In the axial direction, the cylindrical section 8 is delimited on the shaft side by a finely worked end face 11 which extends at right angles in respect to the center axis 10 and which, with the shaft 6 inserted into the receiving bore 5, is in contact without play with a corresponding end face 12 on the front of the spindle 2. An annular shoulder 13 of the tool body of the milling tool 7, whose diameter is greater than the diameter of the cylindrical section 8, adjoins the cylindrical section 8 on the opposite side.

Figure 6:
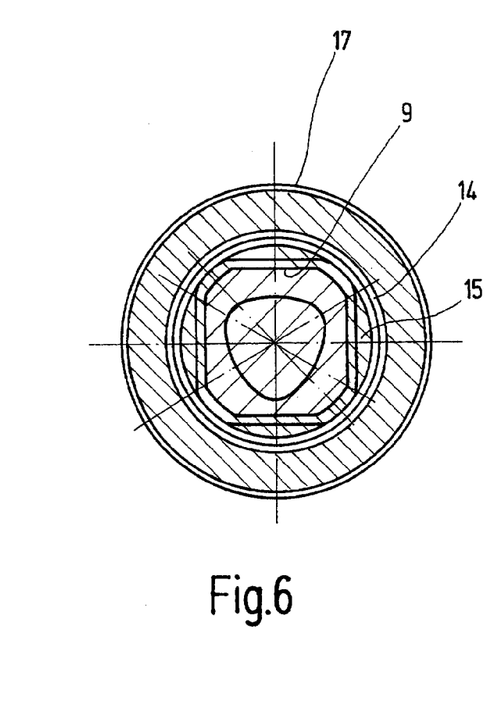
FIG. 6 represents the arrangement of FIG. 5, cut along the line VI—VI in FIG. 5, in a lateral view with the housing of the tool holder left out.

A split ring 14 has been placed on the cylindrical section 8 of the milling tool, whose inside is matched to the shape of the clamping grooves 9, which can be seen particularly in the sectional representation in FIG. 6. The split ring 14, which radially protrudes past the circumferential surface of the cylindrical section 8 has a substantially trapezoidal shape (see FIG. 2) with a correspondingly designed strip 15 for engaging the respective clamping groove 9. The two parts of the split ring 14 are maintained in the four clamping grooves 9 by an elastic element, for example a round cord ring 16.

A tensioning nut 17 embodied as a cap nut and screwed on a matching external screw thread 18 of the spindle 2 acts on the split ring 14, which is delimited by tapering faces on the outside.

As can be seen, for example in FIG. 2, the cap nut extends with an annular flange 19, which extends as far as close to the cylindrical section 8, over the split ring 14, so that it is maintained, secure against loss, with axial play on the milling tool 7 by the ring 14 and the annular shoulder 13.

On one inside, the annular flange 19 has a tapered face which is matched to the adjoining outer tapered face of the split ring, while the cap nut 17 is embodied with a knurling 20 on its outer circumference and with radial bores 21, arranged spaced over the circumference, which are used for applying a hooked wrench.

The milling tool 7, embodied as a quick-action change insert, is clamped in a simple manner in the tool receiver 4 of the spindle 2 of the tool holder in that, following the placement of the cap nut 17 on the cylindrical section 8 of the milling tool 7, the two parts of the split ring 14 are inserted into the clamping grooves 9 and are fixed in place therein by attaching the round cord ring 16. The milling tool 7 prepared in this way and constituting a tool means is then placed with its shaft 6 into the receiving bore 5 of the spindle 2, after which the cap nut 17 is screwed on the external screw thread 18 on the spindle 9 and is tightened. In the course of this the end faces 11, 12 are pressed against each other without play by means of the ring 14 and the annular flange 19 so that, together with the receiver 6 of close tolerances in the receiving bore 5, an exact alignment of the milling tool 7, which is clamped in an exact position, results. The knurling 20 of the cap nut 17 makes screwing the cap nut on the external screw thread 18 easier prior to the cap nut 17 being tightened, as mentioned, by means of a hooked wrench engaging the radial bores 21.

Figure 4:
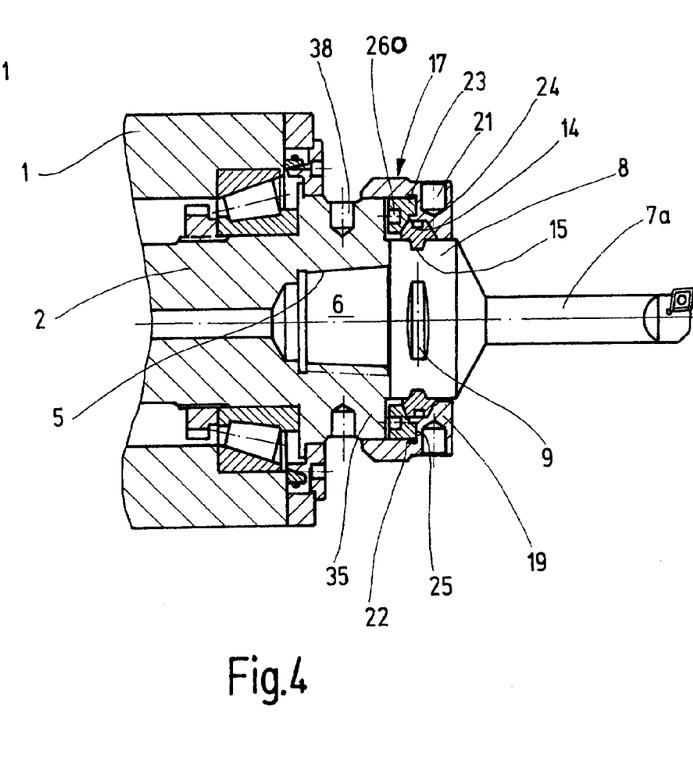
FIG. 4 represents a tool holder with a modified embodiment of a tool clamping device in accordance with the invention in an axially cut representation corresponding to FIG. 2.

The embodiment represented in FIG. 4 differs from the embodiment explained by means of FIGS. 1 to 3 only in that a boring tool 7a has been inserted into the tool receiver 4 of the spindle 2. Therefore identical parts have been provided with the same reference symbols and will not be explained again.

Differing from the milling tool 7 in FIG. 2, the boring tool 7a is designed in such a way that the cylindrical section 8, which axially adjoins the polygonal shaft 6 and supports the clamping grooves, is not bordered by an annular shoulder or the like on the tool side. The section 8, which is completely cylindrically designed over its axial length and constitutes a clamping area with its clamping grooves 9, allows the use of the tensioning nut 17, embodied as a cap nut 17 in accordance with FIG. 2, for clamping the boring tool 7a. However, the cap nut 17 is not maintained secure against loss on the boring tool 7a without additional measures. To achieve this, a threaded ring 23 is screwed into the internal screw thread 22, whose axial length is of such a size that it is located at a slight radial distance from the adjoining front face of the spindle 2 when the end faces 11, 12 are in level contact, as can be seen in FIG. 4. Therefore the threaded ring 23 does not hamper the clamping process of the boring tool. On its inside facing the split ring 14, it is provided with an inner tapered surface 24 corresponding to the outer tapered surface of the split ring 14, and in the tightened state its front face is seated on a ring-shaped level surface 25 of the annular flange 19 of the cap nut 17. In this position of the threaded ring 23, the tensioning screw 17 is held, secure against being lost, with axial play on the split ring 14. Axial bores 260, into which a face wrench can be inserted, are used for tightening the threaded ring.

The clamping process of the boring tool 7a is similar to that of the milling tool 7 in FIG. 2 and therefore need not be explained again.

Figure 5:
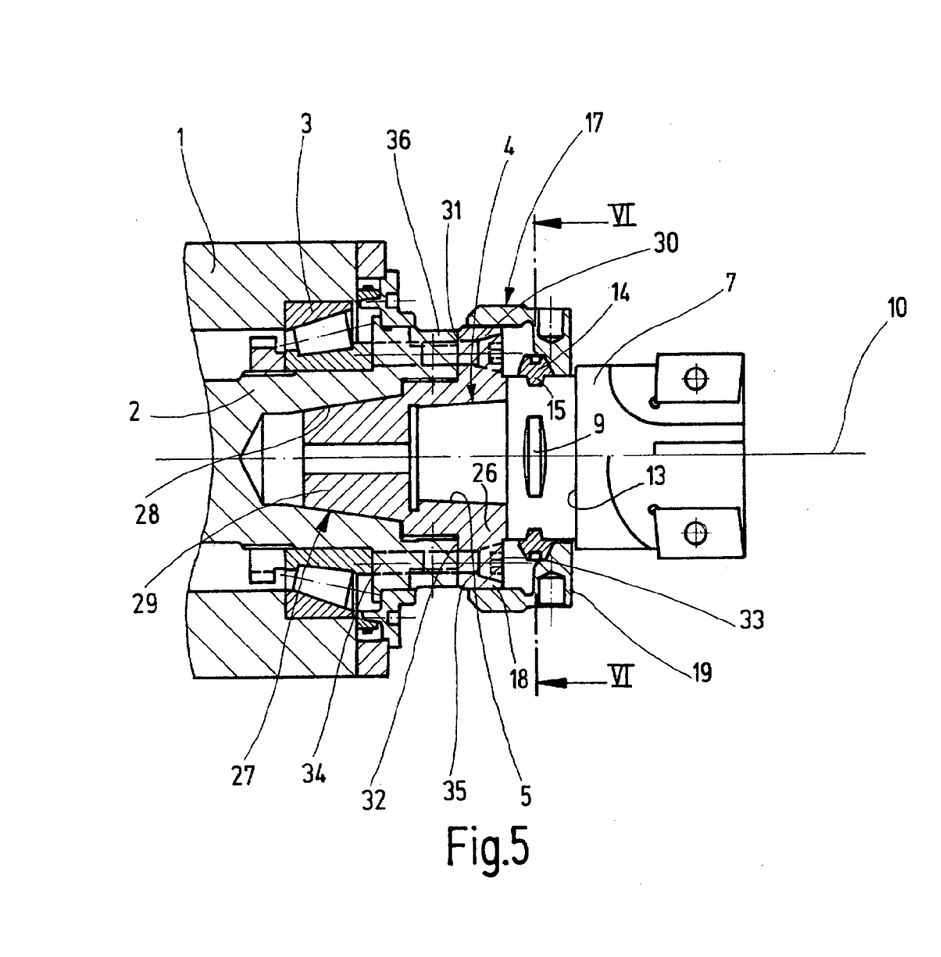
FIG. 5 shows a tool holder similar to FIG. 1, but with a tool clamping insert placed into the work spindle and with a tool clamping device in accordance with the invention, in an axially cut representation similar to FIG. 2.

The embodiment in accordance with FIG. 5 is basically similar to that in accordance with FIG. 2, so that in this case identical parts are also provided with the same reference symbols and will not be explained again. However, while in the embodiment in accordance with FIG. 2 the milling tool 7 is inserted with its shaft 6 into the tool receiver 4 formed directly on the spindle 2, the arrangement in FIG. 5 is such that the tool receiver 4 with its receiving bore 5 is arranged in its own tool clamping insert 26, which is positively connected accurate to size with the spindle 2.

For this purpose the spindle 2 is embodied with a collet clamp receiver 27 having a tapering receiving bore, for example in accordance with DIN 6499, in whose receiving bore 28 a clamping shaft 29, which is appropriately taperingly designed, of the tool clamping insert 26 has been inserted in place of the collet chuck. The tool clamping insert 26 is embodied with an annular flange 30, which has the external screw thread 18 for the cap nut 17, and which is provided with an end face 31 extending at right angles in respect to the longitudinal center axis 10, and which rests without play on a corresponding end face 32 of the spindle 2 in the assembled state. Axial tensioning screws 33, which are arranged spaced over the circumference, penetrate through the annular flange 30 and are screwed into appropriate threaded bores 34 of the spindle 2, are used for the positive connection of the clamping insert 26 with the spindle 2. The tensioning screws 33 are provided with conical screw heads in order to assure perfect clamping without play.

The milling tool 7 is the same as the milling tool 7 in FIG. 2, i.e. its cylindrical section 8 is delimited in the axial direction by the annular shoulder 13 on one side. Apart from the already explained holding of the cap nut secure against loss on the tool body of the milling tool 7, the annular shoulder has a special importance as a detent means when releasing the milling tool 7 from the spindle 2. In the course of unscrewing the cap nut 17 from the spindle 2, the annular flange 19 runs axially up on the annular shoulder 13, with which the shaft 6 of the milling tool 7 is pulled out of the receiving bore 5 exactly centered.

In the embodiment in accordance with FIG. 4, the same task is performed by the threaded ring 23, which in the course of unscrewing the cap nut 17 runs up on the split ring and by means of the latter pushes the boring tool 7a away from the spindle 2.

In the course of tightening the tensioning nut 17 for clamping the associated tool 7 or 7a, the spindle must be temporarily arrested, fixed against relative rotation. This can be done with the aid of a hooked wrench in accordance with DIN 1810, November 1967, for whose application grooves or recesses with open edges are provided and are distributed along the circumference of a cylindrical extension 18 of the spindle 2, which protrudes axially past the housing 1 and holds the external screw thread 18 and the end face 12 (FIGS. 2, 4). These recesses can be designed in a manner known per se as grooves delimited by parallel flanks as indicated in FIG. 5 at 36. They can also be designed as blind bores or have the form, represented in FIGS. 1 to 4, as recesses 38 in the form of elongated holes.

A considerable easing of the actuation of the tensioning nut 17 can be achieved by using a double-hooked wrench 39, which is illustrated in FIGS. 1 and 2. The double-hooked wrench 39 has an essentially L-shaped form with two legs 40, which extend at right angles to each other, each of which has at its end an inwardly oriented pin 41 acting as a blocking element. An elongated hole 42 is provided symmetrically between the two legs 40, whose longitudinal axis rests on the median line 43 of the angle enclosed by the two legs 40. The double-hooked wrench 39 is placed with its elongated hole 42 on a bearing bolt 44 screwed into the housing 1, which is provided extending past the level front face of the housing 1 of the tool holder. As can be seen in FIG. 1, the bearing bolt 1 is designed to taper slightly in the direction toward the housing 1. The distance between the two pins 41 is matched to the separation of the elongated hole-shaped recesses 38 in such a way that, as can be seen in FIG. 3, respectively only one pin 41 engages a recess 38, while the other pin 41 rests on the cylindrical circumferential face of the extension 35. Depending on which one of the two pins 41 engages one of the elongated hole-shaped recesses 38, the spindle 2 is blocked in one or the other direction of rotation, which can be easily understood with the help of FIG. 3. Because of the lever forces occurring during the tightening or releasing of the tensioning nut 17 on the bearing bolt 44, the double-hooked wrench 39 remains suspended in the associated recess 38 during the actuation of the tensioning nut 17 in a clockwise or counterclockwise direction, which is aided by the mentioned embodiment of the bearing bolt 44 as a truncated cone. This applies in particular if the tool holder, as represented in FIG. 1, is used with the shaft 10 in a horizontal position of use, so that the double-hooked wrench 39 lies in a vertical plane.

Naturally the pins 41 can also be replaced by parts used for the same purpose and formed on the legs 40, for example in the form of hooked protrusions, wherein the shape of the recesses 36, 38 is appropriately matched, as already mentioned.

The particular advantage of the hooked wrench 39 results from the fact that both hands are free for actuating the tensioning nut 17. Because of this the clamping nut can be evenly tightened or released. Any danger of an injury because of a slippage of the hooked wrench in the extremely sharp and oily environment is prevented to a large extent by this. The result of tensioning is clearly improved by the even tightening of the tensioning nut 7.

The embodiment represented in FIGS. 7 to 11 is basically similar to the embodiment in accordance with FIG. 5, however with the difference that the clamping means are not constituted by the cap nut 17 represented in FIG. 5, but are designed in a different way. Identical parts have therefore been provided with the same reference symbols and will not be explained again. Reference is made to the explanation in FIG. 5.

The same as with the embodiment in accordance with FIG. 5, the spindle 2 is provided with a collet chuck receiver 27 in accordance with DIN 6499, in whose receiving bore 28 the correspondingly taperingly designed clamping shaft 29 of the tool clamping insert 26 is inserted instead of a collet chuck. The annular flange 30 of the tool clamping insert 26 rests with its end face 31 without play on the corresponding end face 32 of the spindle 2. However, different from FIG. 5, it is not provided with an external screw thread on its exterior, but instead with a cylindrical centering shoulder 45, which is coaxial with the axis 10 and is adjoined on the outside by a front end face 46 extending at right angles with it. A quick-action clamping device 47, embodied as a component, has been placed on the centering shoulder 45 and is seated accurately aligned on the front end face 46 and fastened on the cylinder flange 30 by means of pan head cap screws 48. The milling tool 7, which is designed identical to the one in FIG. 5, is clamped in the quick-action clamping device 47.

Figure 10:
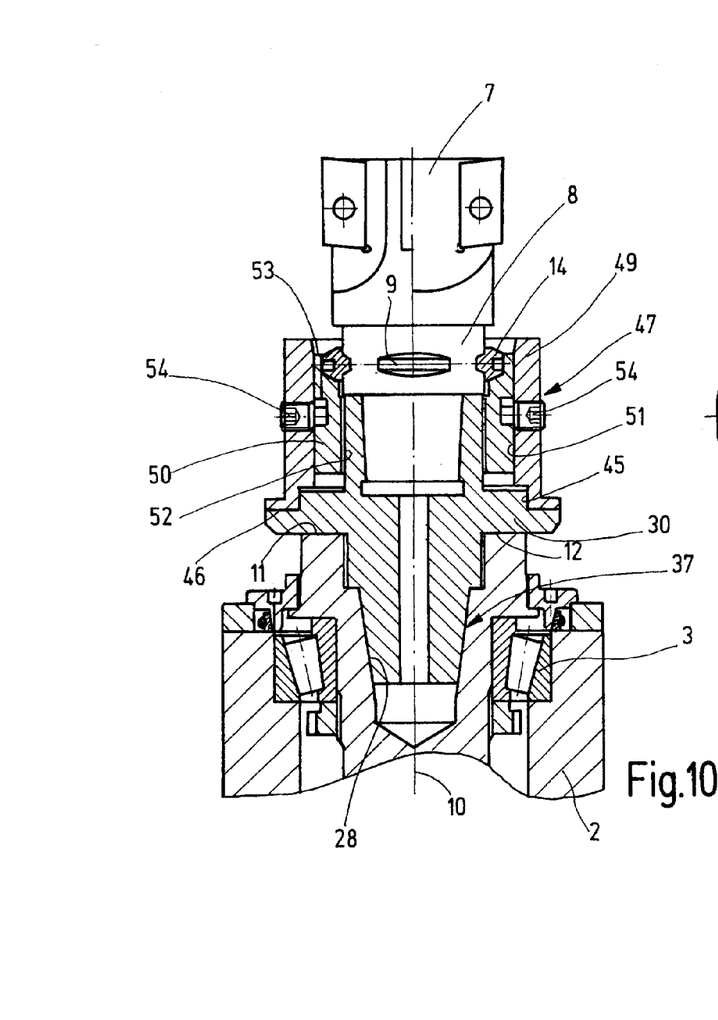
FIG. 10 shows the tool holder in accordance with FIG. 7 in a sectional representation corresponding to the line X—X in FIG. 9 in a lateral view.

The quick-action clamping device 47 has a cylindrical housing 49, which is centered coaxially in relation to the longitudinal axis 10 by means of the centering shoulder 45 and is screwed together with the annular flange 26 by means of the pan head cap screws 48. A ring-shaped clamping body 50 is seated, axially displaceable, in the housing 49 and is guided on its exterior on a cylinder face 51 of the housing 49, while its inside located cylinder face 52 is at a slight axial distance from the cylindrical exterior of the cylindrical section 8 of the inserted milling tool 7. As can be seen in FIG. 10 in particular, on each of its oppositely located sides the exterior of the clamping body 50 is embodied with an elongated hole groove 53, which is aligned axis-parallel with the longitudinal axis 10 and into which protrudes a straight pin 54, which has been screwed into a corresponding threaded bore of the housing 49, limits the axial movement of the clamping body 50 in respect to the housing 49 and simultaneously constitutes a twist-prevention device for the clamping body 50.

Figure 7:
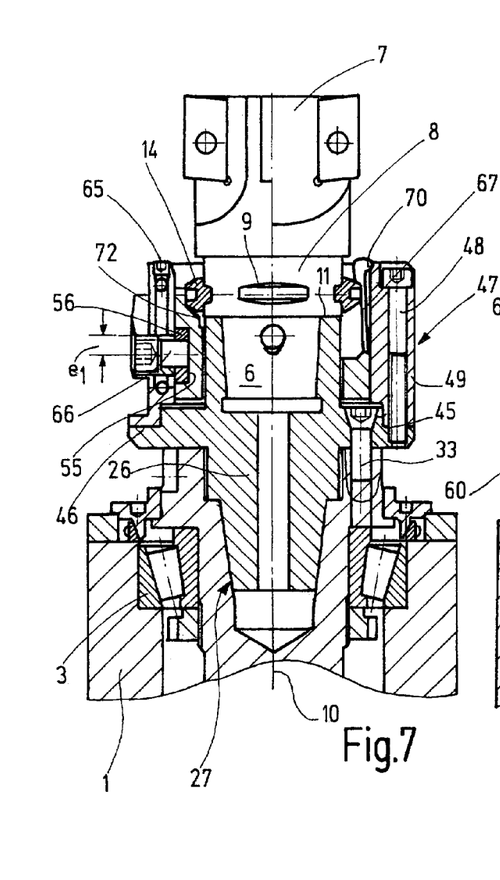
FIG. 7 shows a tool holder similar to FIG. 5 with a modified embodiment of the clamping device in a representation axially cut along the line VII—VII in FIG. 9 and in the clamped state.
Figure 9:
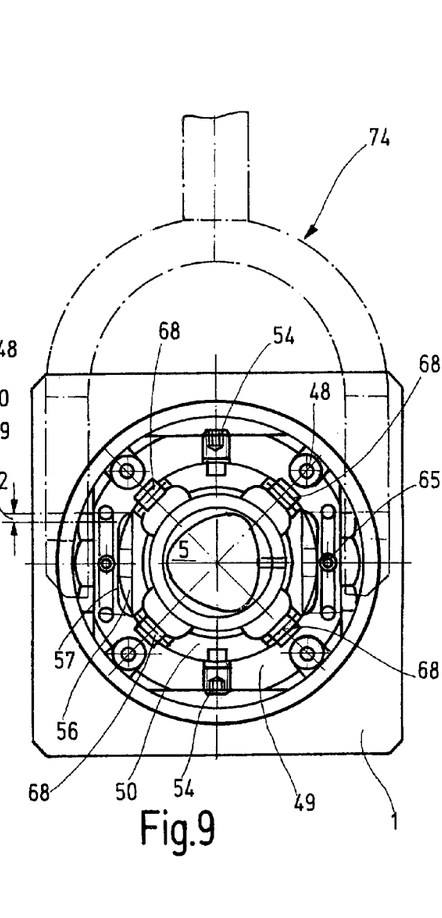
FIG. 9 shows the arrangement in accordance with FIG. 7 in a view on the tool side and with the tool removed.

As can be seen in FIGS. 7 and 9, driving grooves 55 are formed on two oppositely located sides of the clamping body 50, into each of which a sliding block 56 has been inserted. Located opposite the respective sliding block 56, a cutout 57 is provided in the housing 49, in which the assigned sliding block 56 is received and can be transversely displaced to make possible an eccentric lift movement e2 (FIG. 9). Furthermore, in the area of each one of these two cutouts 57 a continuous bearing bore 58 is formed in the housing 49, whose inner wall is designed as an annular groove 60 and receives an eccentric disk 61, which is provided with a wrench face receiving shoulder 62 located on the exterior. A ball race groove 63 is embodied on the circumference of the eccentric disk 61 which, together with the oppositely located annular groove 60 of the housing 49, receives balls 64 constituting a ball bearing of the eccentric disk 61 in the housing bore 58. The balls 64 can be inserted through a ball filler opening, which is closed by means of a set screw 65. The eccentric disks 61, which are rotatably seated via the balls 64, are each connected with an eccentric pin 66, which protrudes into the housing interior and is offset in respect to the axis of rotation of the respective eccentric disk 61 by an amount which is defined by e1 in FIG. 7. The cylindrical eccentric pin 66 protrudes into a corresponding bore of the associated sliding block 56, in which it is rotatably seated.

By means of turning the two eccentric disks 61 located across each other around their common axis of rotation it is therefore possible to create an axial movement of the clamping body 50 in respect to the housing 49, the lift of which is limited by the elongated hole grooves 53 and the setscrews 54.

On the side of the ring-shaped clamping body 50 facing away from the annular flange 30, four collet chuck-like clamping arms 67 are formed, which have been arranged evenly offset along the circumference and which, with the tool 7 inserted, extend at a radial distance to the ring 14 of the latter, which is seated on the cylindrical section 8, and can be supported radially toward the outside on the inner wall of the housing 49. Each one of the clamping arms 67, which is elastically movable radially inward has a clamping head 68 on its end, which is embodied with a clamping face 69 on its inside, whose shape is matched to the tapering outer faces of the ring 14. Each clamping head 68 is provided with an inclined face 70 on its side located radially outward, which can be supported on an inclined face 71, widening in a funnel shape toward the outside, at the inner edge of the housing 49.

Figure 8:
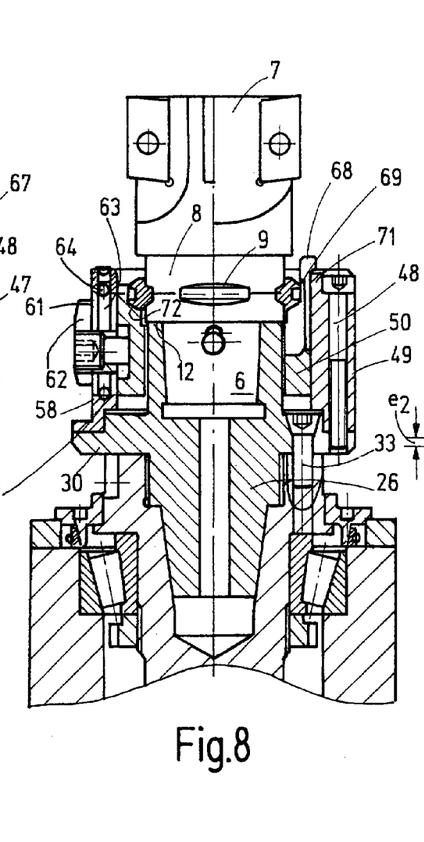
FIG. 8 represents the arrangement in accordance with FIG. 7, illustrating the relaxed state of the clamping device in an appropriate sectional representation.

In the relaxed state the clamping body 50 is axially pushed forward in respect to the annular flange 30 in the way which can be seen in FIG. 8, so that the clamping heads 68 of the clamping arms 67 axially protrude past the inner edge of the housing 49 and are in a radially outward position in which they do not interfere with the passage of the ring 14 of the tool 7. Therefore the tool 7 can be inserted unhindered into the receiver 4, or taken out of it. For clamping the tool 7, the two eccentric disks 61 are rotated in the same direction, because of which the clamping body 50 is axially retracted out of the position shown in FIG. 8 into the position in FIG. 7. In the course of this the clamping heads 58 run up with their inclined faces 70 on the inner inclined faces 71 of the housing 49, because of which they are moved radially inward so that their clamping faces 69 come to rest on the ring 14 of the tool 7. During continued rotational movement of the eccentric disks 61, they push the tool 7 by its ring 14 with its clamping pins 6 into the receiving bore 5 of the clamping insert 26 until the two end faces 11, 12 of the cylindrical section 8 and of the clamping insert 26 rest tightly against each other, so that the tool 7 is perfectly clamped.

For releasing the tool 7, which was clamped in the described way, the two eccentric disks 61 are rotated in the opposite direction of rotation. In the course of this a front face 72 provided on the clamping body 50 and extending in the clamped state at an axial distance from the ring 14 comes to rest after a defined initial eccentric lifting movement against the trapezoidal side on the bottom of the ring 14 (see FIG. 8), with the result that the tool 7 with its clamping pin is pulled out of the receiver 4 and is released. As shown in FIG. 8, at the end of the eccentric movement the clamping heads 68 no longer are in contact with the ring 14 and the inclined inner housing face 71, so that the freely resilient clamping arms 67 make it possible to pull the tool 7 out manually with little effort.

Figure 11:
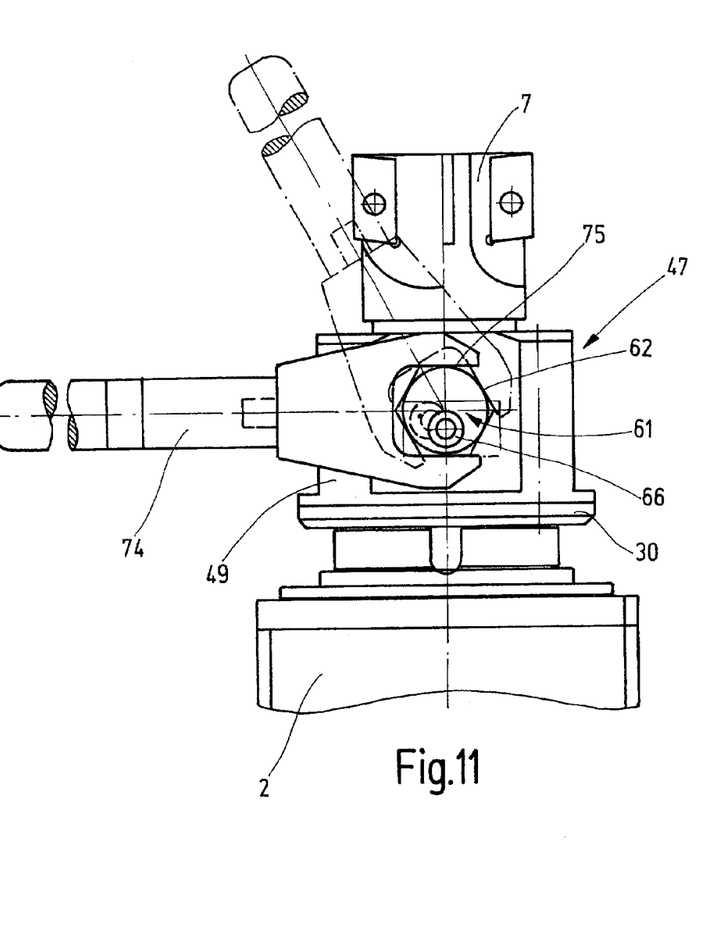
FIG. 11 shows the arrangement in accordance with FIG. 9 in a lateral view turned by 90°.

In the clamped position in accordance with FIG. 7, the eccentric disks 61 are self-lockingly blocked, as can be seen in FIG. 11. The eccentric pins 66 are located on the other side of dead center.

For the simultaneously synchronous rotation of the two oppositely located eccentric disks 61 a double open-end wrench 74 is advantageously used, which is designed in the manner to be seen in FIGS. 9, 11 and which acts with its two wrench openings 73, which are located opposite each other, on the wrench face receiving shoulders 62 of the two eccentric disks 61. The double open-end wrench 74 is simply pushed on the wrench face receiving shoulders 62 and can be simply pivoted out of the clamping position, shown in solid lines in FIG. 11, into the release position represented by dash-dotted lines, in order to release the tool 7 out of its receiver. In this case the pivot path of the open-end wrench 74 is less than 90°, it amounts to approximately 45° so that, as already mentioned, the clamping means, in this embodiment in the form of quick-action clamping means, permit a particularly rapid tool change.

Figure 12:
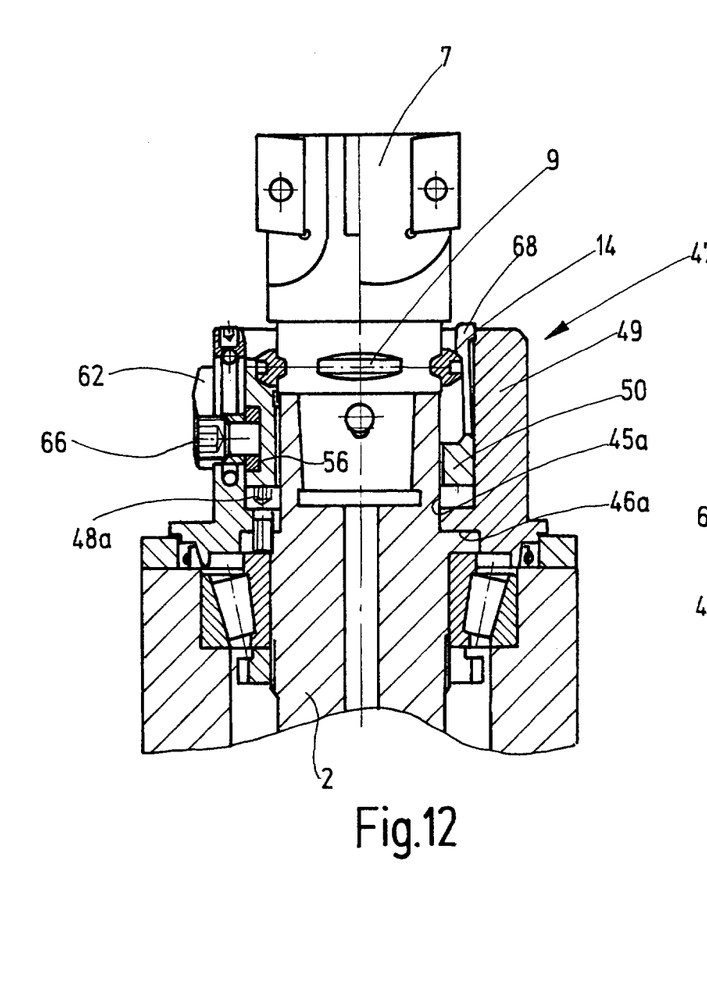
FIG. 12 represents a tool holder similar to FIG. 1, but in a modified embodiment, with a tool inserted into the work spindle in an axially cut representation similar to FIG. 1.

The quick-action clamping device 47 described above can naturally also be fastened directly on the spindle 2, as represented in FIG. 12. With this, basically the same conditions result as with the embodiments in accordance with FIGS. 1, 2. Therefore identical parts are also provided here with the same reference symbols and will not be explained again. In this case the centering shoulder 45a is embodied directly on the spindle 2, which also constitutes the front end face 46a corresponding to the end face 46 in FIG. 10. Fastening by means of the pan head cap screws 48a is only represented by way of example. Basically other fastening means are naturally also possible.

Figure 13:
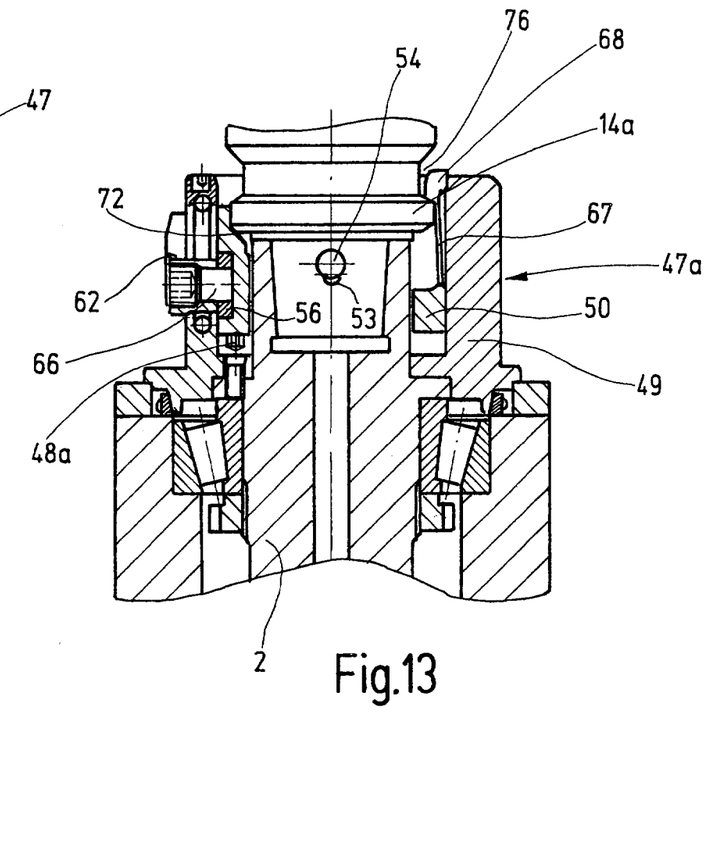
FIG. 13 shows the arrangement in accordance with FIG. 12, illustrating a tool with a ring formed on it and inserted into the work spindle, in an axially cut representation corresponding to FIG. 12.

Finally, FIG. 13 shows that the quick-action change clamping device 47 in FIGS. 10, 12 can also be used in connection with tools 7a, in which the ring 14a is formed by the circularly extending border of a groove 76. The annular groove 76 is embodied with tapering lateral groove walls, so that the same clamping conditions result for the clamping arms 68 as with the ring 14 of FIG. 7. The same also applies to the conditions in connection with the release of the tool from the receiver. In this case the front face 72 again runs up against the correspondingly tapering exterior of the rings 14a, here of one piece, in order to pull the tool out of the receiver 4.

With all the above explained embodiments, clamping of the tool always takes place from the tool side of the tool holder 1, regardless of whether the cap nut 17 is screwed on or off, or the eccentric disks 61 are rotated around the axes of rotation. It should be stressed at this point that other mechanisms for clamping the tool provided with a ring 14, 14a, or the quick-action change inserts 47, which have clamping means acting on the ring 14, 14a, are fastened on the tool support in the form of the spindle 2 or of the clamping insert 26, and which permit the actuation from the tool side, can be employed in the manner explained. For example, the clamping body 50 could be displaceable in the housing 49, not by means of the eccentric drive, but by a motion screw thread or other screw thread.

As mentioned, the ring 14a can also be designed as a lateral groove wall. In general, it applies that the ring 14 can be of one piece or several pieces, and can extend over the entire circumference of the clamping area, or only over a portion thereof.

What is claimed is:

1. A tool clamping device; comprising:
   a tool support means (2), containing a tool receiver (4) including a receiving bore (5),
   a tool means (7, 7a) with a shaft (6) having a center axis (10), which can be inserted into the receiving bore (5) wherein the receiving bore (5) has a cross section extending at a right angle to the shaft center axis (10), wherein the tool means shaft (6) has a cross section matching the cross section of the bore (5), wherein the shaft (6) when inserted into the receiving bore (5) is in contact with the bore (5) at close tolerance, and
   the tool means including a cylindrical section (8) which extends at a right angle with respect to the shaft center axis (10) in a circumferential direction, wherein the tool support means (2) has an end face (12), wherein the cylindrical section (8) has an end face (11) and wherein the end face (11) of the cylindrical section and the end face (12) of the tool support means are in contact without play when the shaft (6) is inserted into the receiving bore (5);
   the cylindrical section (8) further including clamping grooves (9) circumscribing the cylindrical section (8) at right angles with respect to the shaft center axis (10);
   a ring (14) circumscribing the cylindrical section (8) at right angles with respect to the shaft center axis (10), and engaging the clamping grooves (9);
   a clamping device, having clamping means (17, 67, 68), which can be directly or indirectly fastened in place on the tool support means (2), and
   wherein the ring (14) radially protrudes past the tool means in a clamping area and extends in the circumferential direction with respect to the shaft center axis (10) and wherein the clamping means (17, 67, 68) are fastened in place on the tool support means on the ring and are (2) axially supported when the shaft (6) has been inserted into the receiving bore (5).

2. The tool clamping device in accordance with claim 1, characterized in that the ring is a split ring (14).

3. The tool clamping device in accordance with claim 2, characterized in that the tool means (7) is a tool quick-action change insert wherein the split ring (14) inserted into the clamping grooves (9) is fixed in place by attaching a round cord ring (16).

4. The tool clamping device in accordance with claim 1, characterized in that with the shaft (6) inserted into the receiving bore (5), the clamping means (17, 67, 68) can be actuated from the side of the tool support means (2), which faces the tool means (7, 7a).

5. The tool clamping device in accordance with claim 1 characterized in that detent means (13, 23, 72), which become effective when the clamping means are released, are assigned to the clamping means (17, 67, 68), by means of which the tool means (7, 7a) can be pulled out of the tool receiver (4) by actuating the clamping means in the release direction.

6. The tool clamping device in accordance with claim 1, characterized in that the receiving bore of the tool receiver is embodied as a tapering bore (28), which is equipped for receiving a collet chuck.

7. The tool clamping device in accordance with claim 1, characterized in that the tool support means (2) have a tool clamping insert (26), which is connected with the tool support means and contains the tool receiver (4).

8. The tool clamping device in accordance with claim 7, characterized in that the clamping means are fastened in place on the tool clamping insert (26).

9. The tool clamping device in accordance with claim 7, characterized in that the tool receiver (4), formed on the tool clamping insert, contains the receiving bore, which is equipped as a tapered bore for receiving a collet chuck.

10. The tool clamping device in accordance with claim 1, characterized in that the clamping means have a tensioning nut (17), which can be screwed onto a screw thread (18) of the tool support means (2), or of an element (26) connected therewith.

11. The tool clamping device in accordance with claim 10, characterized in that the tensioning nut (17) is maintained, secure against loss, on the tool means (7, 7a).

12. The tool clamping device in accordance with claim 10, characterized in that the tensioning nut (17) is a cap nut.

13. The tool clamping device in accordance with claim 12, characterized in that the tensioning nut (17) is maintained between the ring (14) and axial detent means (13, 23) on the tool means (7, 7a) or on the screw thread (18).

14. The tool clamping device in accordance with claim 1, characterized in that the clamping means have clamping elements (67, 68) acting on the ring (14), which are seated radially movable in a restricted manner and can be clamped against the ring (14) of the tool support means in the axial direction.

15. The tool clamping device in accordance with claim 14, characterized in that the clamping elements are connected, radially movable in a restricted manner, with a clamping body (50), which is seated, axially displaceable, on the tool support means of an element (49) connected therewith, and to which actuating means are assigned, which are accessible from the exterior and generate an axial movement.

16. The tool clamping device in accordance with claim 15, characterized in that the actuating means contain two eccentric drive mechanisms (61, 66), which are arranged opposite each other.

17. The tool clamping device in accordance with claim 1, including a hooked wrench (39) and characterized in that the tool support means (2) have on their circumference at least one recess (36, 38), to which the hooked wrench (39) can be applied, wherein the hooked wrench (39) has an essentially L-shaped form with two legs (40), which extend at right angles to each other, each of the legs (40) has at its end an inwardly oriented pin (41) acting as a blocking element, and wherein the wrench (39) also includes an elongated hole (42) provided symmetrically between the two legs (40), whose longitudinally axis rests on a median line (43) of the angle enclosed by the two legs (40), the hooked wrench (39) is placed with the elongated hole (42) on a bearing bolt (44) screwed into a housing (1), which housing houses tool support means (2), and wherein one of the pin (41) engages a recess (36, 38) of said at least one recess and the other pin (41) of the other leg (40) is maintained out of contact with a recess of said least one recess.

* * * * *